United States Patent Office 3,249,687
Patented May 3, 1966

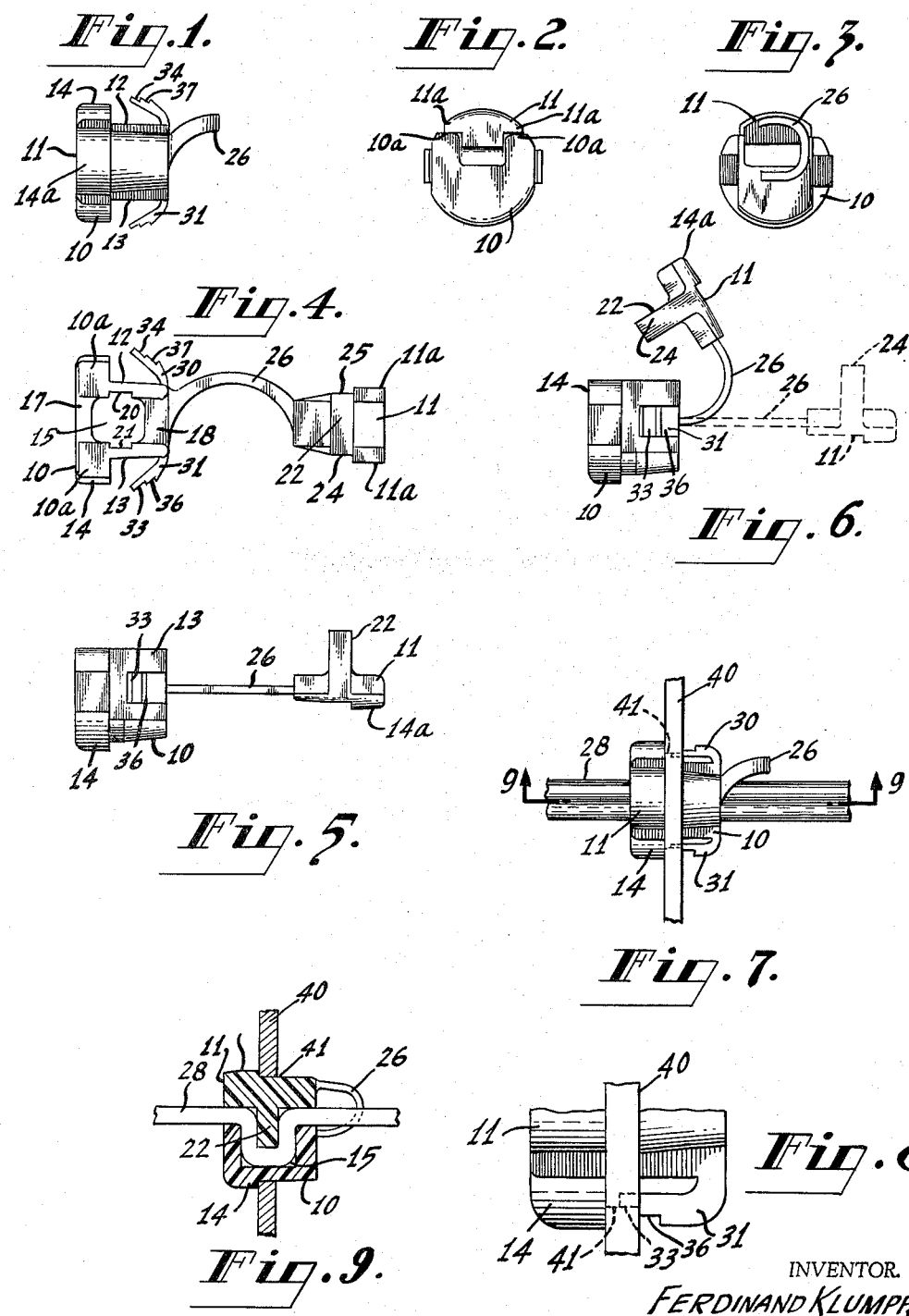

3,249,687
STRAIN RELIEF BUSHING
Ferdinand Klumpp, Jr., Union, N.J., assignor to Heyman Manufacturing Company
Continuation of application Ser. No. 325,026, Nov. 20, 1963. This application May 28, 1965, Ser. No. 466,497
5 Claims. (Cl. 174—153)

This application is a continuation of my application, Serial No. 325,026, filed November 20, 1963, for a Strain Relief Bushing.

This invention relates to a self-locking strain relief bushing which is adapted to securely lock an electrical conductor or cable in the bushing or grommet when the bushing is inserted into an aperture in a plate or support on which the bushing is supported.

Strain relief devices are employed in connection with various electrical appliances and apparatus such as radio, television, and many other forms of electrical devices and apparatus, and serve to relieve strain upon the electrical conductor wires or cables connected thereto so as to avoid possible severance from or impair proper connection of the conductor wires to terminals to which they are normally connected, and to also preclude damage to parts and avoidance of possible short circuits.

In previously available two part strain reliefs, whether joined or not, used with the old soft wire conductors having relatively thick insulation, the wire gripped between the parts would cause the parts to spring back so that the flanges or shoulders at one end of the strain relief would engage opposite sides of the panel into which the strain relief was inserted.

There is now presently and widely used a thin jacketed stiff conductor or wire which becomes rigidly formed when it is clamped in a two part bushing. There is no spring back to cause the flanges or shoulders of the bushing to engage a supporting panel and be locked thereon. The functions of clamping the conductor within the bushing and supporting the conductor and bushing in the panel in locked relationship therefore become separate functions independent of each other.

It is desirable to be able to preassemble the strain relief bushing on the conductor and after the assembly, insert the assembly into the hole or aperture in the panel without the need for a special tool for closing and holding the assembly while pushing it through the aperture in the panel.

It is also desirable to have a strain relief bushing which is capable of gripping the insulated wires or conductors over a larger area, hence providing a better and more firm gripping action. Further, it is desirable to have such an increased gripping action without overcompressing the conductors which may cause damage to the wire or the strain relief bushing.

The strain relief bushing to be described has separate locking functions; one function is to lock the wire in the strain relief, and the other is to lock the strain relief in the panel. Separating the two locking functions satisfies the Underwriters Laboratory 35 pound pull out test on the thin jacket power wires.

All present strain relief bushings utilize the "spring back" quality of the wire to lock the bushing in the panel. However, this "spring back" takes away from the locking pressure on the wire. The new power wires have very thin insulating jackets with practically no resiliency, and therefore slip more readily through a strain relief bushing and have very little "spring back" quality. The "spring back" action of the strain relief comes from the resiliency of the insulating jacket of the wire.

Since the new wires lack resiliency and a thick jacket which are needed to hold the U.L. test, a new method of holding the wire is needed. Now the tongue is used only for clamping the wires, and the resilient fingers are used only to hold the bushing in the hole.

The old locking slot in previous bushing is eliminated in my present bushing as there is no longer any need for it as the fingers now do all the locking in the panel.

The use of fingers with more than one step covers a much broader range of panel thicknesses than the old constructions. This is an improvement over the old single thickness slot and very necessary to cover the variety of chassis thickness used by today's appliance manufacturers.

It is therefore an object of my invention to provide an improved self-locking strain relief bushing particularly suitable for use with thin jacketed stiff wires or conductors and which separates the functions of gripping the conductors and locking the gripped conductors and the bushing in a supporting panel.

Another object of my invention is to provide such a bushing which can be manually preassembled on the conductor and the assembly inserted in an aperture in a supporting panel without the use of special tools.

A further object of my invention is to provide such an improved strain relief bushing having an improved gripping action but which avoids overcompressing of the wires or conductors, and which completely insulates the wires from the panel.

In the drawings:

FIG. 1 is a side elevation of a strain relief bushing made according to my invention;

FIG. 2 is a left end view of FIG. 1 rotated 90°;

FIG. 3 is a right end view of FIG. 1 rotated 90°;

FIG. 4 is a plan view of the bushing or grommet in its unassembled relationship as taken from the mold;

FIG. 5 is a side elevation of FIG. 4;

FIG. 6 shows the relationship of the two parts in an intermediate position prior to clamping a conductor therebetween prior to assembly with a conductor;

FIG. 7 is a plan view of the grommet with a pair of conductors assembled together and mounted in a supporting panel;

FIG. 8 is an enlarged fragmentary view of FIG. 7; and

FIG. 9 is a section taken through FIG. 7 along the line 9—9.

A strain relief bushing or grommet made according to my invention comprises a body portion 10 and an insert or grip block 11 co-operating therewith, the body portion and grip block providing interconnected shank sections which may be said to constitute an axial shank. The body portion is provided with a first shank section having flat sides 12 and 13 to be received within an appropriate supporting member, for example, a panel having a properly shaped opening or aperture therein. The flat sides prevent rotation of the bushing in the panel. The body portion has an end flange or head 14 which abuts the surface of the supporting member when in use. The body portion may also be made elongated or round in tranverse section. The body member 10 is provided internally therein with a chamber 15 having end walls 17 and 18. The side walls of the chamber 15 are provided with guide channels or grooves 20 and 21 extending transversely of the longitudinal axis of the bushing.

Received within the body portion 10 is the insert or grip block 11 having a tongue or extension 22 provided with the ribs 24 and 25 which are received within the channels or keyways 20 and 21. The insert or grip block 11 is provided with a head or flange portion 14a which abuts the surface of the supporting member. The flange portion is provided with shoulders or extensions 11a which abut the surfaces 10a of the body portion, when the bushing is assembled, the surfaces 10a acting as stops to limit the movement of the grip block into the chamber 15. The grip block 11 is otherwise shaped to conform to the shape of the body member 10.

The grip block 11 and body member 10 are integrally joined by the flexible strap or hinge 26. While the hinge or strap 26 is shown connected to one end of the bushing, it could as well be connected to the other ends of the two part bushing. It is preferable to have the strap disposed as shown for appearance sake. The strap is of arcuate form so that it is offset with respect to the conductors clamped between the two parts of the bushing to facilitate assembly. The strap is of sufficient length so that the parts may be moved relative to each other in all planes, there being no great resistance to inserting member 11 within member 10 for gripping the conductor 28.

In accordance with my invention, I provide the body portion 10 on the flat sides 12 and 13 thereof with flexible fingers 30 and 31. These fingers are fixed at one end and spaced from the flange 14, and extend at an angle to the flat sides 12 and 13. The free ends or the ends adjacent the flange 14 are each provided with one or more steps or shoulders, 33, 34, 36 and 37. The purpose of these shoulders is to accommodate the bushing to plates of different thickness. The fingers at the base portion have some resilience or flexibility so that the bushing may be pushed through a hole or aperture 41 in the supporting panel 40. As the bushing and conductor clamped therein are forced into the aperture from the left (FIG. 7) the fingers are forced inwardly toward the axis of the bushing until the flange portions 14 and 14a abut the surface of panel 40, when the fingers 30 and 31 snap back so that one of the shoulders on each finger will engage the plate 40 and lock the bushing in secure position therein.

A strain relief bushing made according to my invention completely insulates the conductor from the panel and because of its gripping power, can withstand more than a thirty-five pound pull test with conductors having the thin jacketed insulation. The strain relief bushing can be pre-assembled on the wire and inserted into the aperture in the supporting panel without the need for a tool for this purpost. Because the grip on the wires or conductors is separated from the locking action of the bushing in the panel, a strain relief bushing utilizing my invention is more effective in protecting the wires or conductors. There is no loss of pressure on the gripped wire when the strain relief is inserted and installed in the panel aperture since there is no pressure loss which occurs when "spring back" is relied upon to lock the bushing in the aperture.

The conductors or wires are in contact with the walls of the chamber and the tongue of the grip block throughout the entire length of the conductors received within the bushing, thus gripping occurs over a larger area of the bushing and the conductors thus improving the gripping action. Overcompressing is prevented by the built-in safety construction of the shoulders and stop surfaces of the grip block and body member thus protecting the conductors as the bushing.

If desired after assembly of the bushing and the conductors, and prior to insertion in the aperture in the panel, a thin flat retaining ring may be slipped over the bushing into contact with the flange elements 14 and 14a to insure that the assembly is not disturbed while inserting the assembly into the aperture in the supporting panel.

What is claimed is:

1. A strain relief bushing of molded plastic dielectric material adapted to be inserted axially and snapped into fixed position within a complementary aperture of a supporting panel, said bushing including an axial shank comprising a pair of cooperating shank sections for insertion within said aperture, one of said shank sections having an axial wall with flat sides and being of substantially greater circumferential extent than the other shank section and providing a longitudinal recess within which the other shank section interfits in clamped position, a head portion carried by each shank section at the extremities oppositely disposed from the entering end thereof having an outwardly radiating surface for engaging one side of an apertured panel, a resilient finger carried by, spaced from, and overlying at least one of said flat sides of said shank sections and fixed to said entering end and spaced axially from the panel-engaging side of said head portions, said finger being outwardly inclined at an angle to the shank sections and extending toward and terminating in spaced relationship with respect to the head portions whereby the free end of said finger engages the opposite side of the panel when said bushing is inserted in said aperture, the juxtapositioned portions of the shank sections and said head portions providing a longitudinal passage for accommodating an elongated conductor, and a tongue extending from said other of said shank sections into said recess for impinging a conductor to secure it in clamped position within the bushing.

2. A one-piece strain relief bushing of molded dielectric material adapted to be inserted axially and snapped into fixed position within a complementary aperture of a supporting panel, said bushing including an axial shank comprising a pair of cooperating shank sections integrally joined at their entering extremities by a resilient hinge, the bending axis of which traverses the shank axis, said hinge serving to permit juxtapositioning of said shank sections for insertion within said aperture, one of said shank sections having a flat side and a longitudinal recess within which the other shank section interfits in clamped position, a head portion carried by each shank section at the extremities oppositely disposed from the entering end thereof having an outwardly radiating surface for engaging one side of an apertured panel, a flexible finger fixed to at least one of said shank sections, spaced from and overlying said flat side and outwardly inclined toward and terminating in spaced relationship with respect to said head portions for engaging the opposite side of the panel, means extending from the other of said shank sections for impinging a conductor to secure it in clamped position within said longitudinal recess, said hinge being of sufficient length and of such thickness as to permit ready relative movement between the shank sections in all planes prior to assembly to facilitate insertion of said conductor, said hinge having an arcuately shaped form to provide an offset loop having no part registering with the opening projected from the hinge end of said bushing.

3. A one-piece strain relief bushing of molded dielectric material adapted to be inserted axially and snapped into fixed position within a complementary aperture of a supporting panel, said bushing including an axial shank comprising a pair of cooperating shank sections integrally joined at one end by a resilient hinge, said hinge serving to permit juxtapositioning of said shank sections for insertion within said aperture, one of said shank sections having flat sides and providing a longitudinal recess within which the other shank section interfits in clamped position, a head portion carried by each shank section at the same extremity thereof and each head portion having an outwardly radiating surface for engaging one side of an apertured panel, resilient finger means carried by, spaced from and overlying at least one of said flat sides of said shank sections and fixed at one end at a position spaced axially from the panel-engaging side of said head portions, said finger means being outwardly inclined at an angle to the shank sections and extending toward and terminating in spaced relationship with respect to said head portions whereby the free end of said finger means engages the opposite side of the panel when said bushing is inserted in said aperture, and means extending from said other of said shank section into said recess for impinging a conductor received in said bushing to secure said conductor in clamped position within the bushing, said finger means having stepped shoulders at the free end thereof for engaging the other side of said panel.

4. A one-piece strain relief grommet of molded plastic dielectric material adapted to be inserted axially and snapped into fixed position within the complementary aperture of a supporting panel, said grommet including an axial shank comrising a pair of cooperating shank sections integrally joined at one end by a resilient hinge, said hinge serving to permit juxtapositioning of said shank sections for insertion within said aperture, one of said shank sections having a flat side and a substantially greater circumferential extent than the other shank section and providing a longitudinal recess within which the other shank section interfits in clamped position, a head portion carried by each shank section at the same extremity thereof and each head portion having an outwardly radiating surface for engaging one side of an apertured panel, resilient finger means integral with at least one of said shank sections, spaced from and overlying said flat side, and fixed at one end at a position spaced axially from the panel-engaging side of said head portions, said finger means being outwardly inclined at an angle to the shank sections and extending toward and terminating in spaced relationship with respect to said head portions whereby the free end of said finger means engages the opposite side of the panel when said grommet is inserted in said aperture, the juxtapositioned portions of the shank sections and said head portions providing a longitudinal passage for accommodating an elongated conductor, and means extending from said other of said shank section into said recess for impinging a conductor to secure it in clamped position within the grommet, said hinge being of sufficient length and of such thickness as to permit ready relative movement between the shank sections in all planes prior to assembly to facilitate insertion of said conductor.

5. A strain relief bushing of dielectric material adapted to be inserted axially and snapped into fixed position within a complementary aperture of a supporting panel, said bushing including an axial shank comprising a pair of cooperating shank sections integrally joined by a resilient hinge, said hinge serving to permit juxtapositioning of said shank sections for insertion within said aperture, one of said shank sections having flat sides and a substantially greater circumferential extent than the other shank section and providing a longitudinal recess within which the other shank section interfits in clamped position, a head portion carried by each shank section and having an outwardly radiating surface for engaging one side of said apertured panel, resilient fingers, spaced from and overlying said flat sides outwardly inclined towards said head portions, integral with at least one of said shank sections and spaced axially from the panel-engaging side of said head portions, the free end of said fingers terminating in spaced relationship with respect to said head portions and being adapted to engage the opposite side of the panel, and a tongue extending from the other of said shank sections for impinging a conductor clamped between said sections to secure it in clamped position within the bushing.

References Cited by the Examiner

UNITED STATES PATENTS

| | | | |
|---|---|---|---|
| 2,424,757 | 7/1947 | Klumpp | 174—153 |
| 2,424,758 | 7/1947 | Klumpp | 174—153 |
| 2,930,840 | 3/1960 | Klumpp | 174—153 |
| 2,974,186 | 3/1961 | Klumpp | 174—153 |
| 3,079,581 | 2/1963 | Klumpp | 174—153 X |

LARAMIE E. ASKIN, *Primary Examiner.*

JOHN F. BURNS, *Examiner.*